Dec. 28, 1965     W. E. ENGELHARD     3,225,597

PORTABLE PYROMETER

Filed Oct. 22, 1962

INVENTOR.
W. E. ENGELHARD

BY

ATTORNEY

United States Patent Office 3,225,597
Patented Dec. 28, 1965

3,225,597
PORTABLE PYROMETER
William E. Engelhard, Apalachin, N.Y. (% Pyrometer Service Co. Inc., 348 River Road, North Arlington, N.J.)
Filed Oct. 22, 1962, Ser. No. 232,085
2 Claims. (Cl. 73—361)

The present invention is directed to pyrometers of the thermocouple type.

The thermocouple is well established in the art as the primary temperature detecting element with the best combination of all of those properties which are desired in a temperature sensing device, namely, accuracy, simplicity, ruggedness, sensitivity, wide range, small size, stability, availability and low cost. However, the great drawback to the wider use of the thermocouple for routine temperature measurements, both above and below zero, for example in the range from —430° F. to +3200° F. has been the failure of the prior art to produce a simple, rugged indicator which is worthy of the high qualities of the thermocouple. While the thermocouple is produced in a vast number of sizes, materials and shapes to accurately sense a wide range of temperatures, portable electrical instruments which utilize thermocouples are relatively heavy, bulky and greatly dependent for accuracy on the training and skill of the operator.

In view of the foregoing it is an object of the present invention to provide a thermocouple pyrometer which is of such size and weight that it can comfortably be held in the hand and readily slipped into a coat pocket.

It is another object of the present invention to provide a thermocouple pyrometer which can be directly read.

It is another object of the present invention to provide a thermocouple pyrometer which is automatically adjusted for reference junction and battery voltage changes as well as for thermocouple and connecting lead resistance changes.

It is a further object of the present invention to provide a thermocouple potentiometer which requires no attention from the operator and which will provide readings of the same accuracy as those normally provided by industrial thermometers of the mercury in glass type, regardless of the position in which the pyrometer is held.

In conventional portable potentiometer pyrometers, the drain on the working battery is continuous from the time the instrument is set up until the operation is completed. In most cases, the working battery is on drain from the moment it is installed until it is removed. While this process may take a period of months, the size and weight of the battery needed to last this long nullifies the size and weight requirement for a hand held portable device. Moreover, the constant drain gradually lowers the voltage of the working battery. As a result, the drain must be checked against a standard cell or a calibrated milliameter and adjusted by a rheostat to the correct value before the meter can be used. These accessories add to the size and weight of the potentiometer. However, the battery energy which is used during the few seconds required to take a temperature reading could be supplied by a battery of much smaller capacity if the drain is limited to time required to take a reading.

In view of the foregoing, it is a still further object of the present invention to provide means whereby the battery will be on drain only while a reading is being taken. As a result a much smaller battery can be used and the above mentioned accessories can be eliminated. Moreover, a much higher battery drain, for example, 40 to 50 milliamperes versus 1 to 10 milliamperes, can be used with the result that a potentiometer network of greatly reduced resistance can be utilized. This increases the sensitivity of the device directly in proportion to the decrease in resistance. It also provides electrical range suppression so that the meter scale may be anywhere within the spectrum of the thermocouple alloys employed thus eliminating errors and problems of mechanical range suppression and mechanical reference junction compensation as in the prior art. Using the electrical network to provide the null point at the center of the scale means that effect of changes in lead wire and thermocouple resistance will be eliminated at the null point and be one-half the error that would be present in meters of the prior art at the extreme ends of the scale for similar range.

Other and further objects and advantages of the present invention will become apparent to those skilled in the art from a consideration of the following specifications taken in connection with the appended drawings.

In the drawings, which illustrate the best mode presently contemplated for carrying out the invention:

Figure 1:
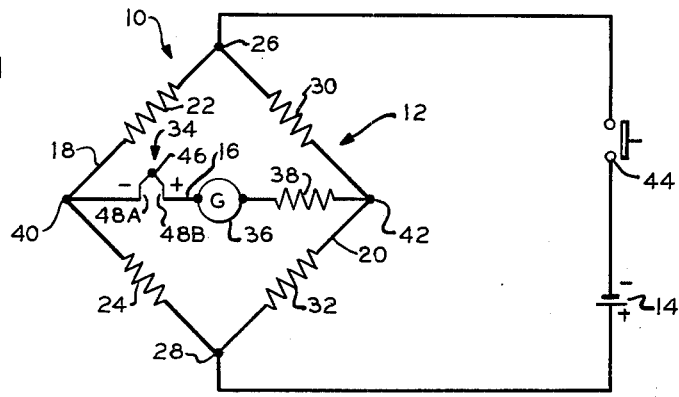
FIGURE 1 is a schematic wiring diagram of a thermocouple pyrometer pursuant to the present invention.

Referring now to FIGURE 1 of the drawings in detail, there is shown a thermocouple pyrometer device 10 pursuant to the present invention. As here shown, device 10 comprises a Wheatstone bridge, generally indicated by the reference numeral 12, a voltage source or battery 14 for supplying voltage to the bridge, and a thermocouple-galvanometer circuit 16 connected across the bridge.

The bridge 12 includes two branches, namely, an automatic reference junction branch 18 and a suppression branch 20. Branch 18 is constituted by the reference-junction compensating resistor 22 and the reference-junction ballast resistor 24 connected in series between the bridge terminals 26 and 28. Branch 20 is constituted by the resistors 30 and the suppression-branch ballast resistor 32 also connected in series between said bridge terminals.

The thermocouple-galvanometer circuit is constituted by the thermocouple 14, the calibrated deflection galvanometer 36 and the adjusting resistor 38, which are connected in series between the bridge terminals 40 and 42. Terminal 40 is in the branch 18 between resistors 22 and 24. Terminal 42 is in branch 20 between resistors 30 and 32.

The positive terminal of battery 14 is connected to bridge terminal 28. The negative battery terminal is connected to one terminal of a single pole switch 44. The other switch terminal is connected to bridge terminal 26.

Battery 14 is a constant voltage mercury dry cell which is subjected to a relatively high drain, for example, 40 to 50 milliamperes during the relatively short periods that switch 44 is closed by an operator so as to permit for the use of a relatively low resistance bridge circuit and thereby to provide relatively high sensitivity in the device 10.

Resistor 22 in bridge branch 18 functions as a reference junction compensating resistance. It is fabricated preferably of copper and has a positive temperature coefficient. In the device 10, as presently constructed, the closed circuit voltage of battery 14 under a 40 to 50 milliampere drain is constant to ¼% of 1.322 volts for a period of 15 seconds after switch 44 is closed. This is a sufficient period of time for the pointer of meter 36 to deflect so that the operator can observe the reading. Using a thermocouple 34 and said closed circuit battery voltage, in calculating the value of resistor 22 for a temperature range of 100°–600° F., resistor 22 should have a value of .5 ohm at 75° F. At 32° F. the value of resistor 22 will change to .4585 ohm. The voltage change for a thermocouple between 32° F. and 75° F. is 1.22 millivolts. Consequently, the current through branch 18 must then be such as to provide a change of 1.22 millivolts in the voltage drop across resistor 22 as its temperature drops from 75° F. to 32° F. To provide this result the current through branch 18 should be 29.40 milliamperes so that the total resistance in the branch should be 45.07 ohms which then requires that the resistor 24 should be 44.57 ohms.

The thermocouple 34 provides a voltage drop in response to a temperature difference between its junction 46 and its ends 48A and 48B. However, changes in the ambient temperature to which the thermocouple is subjected will change the current flow in the thermocouple-galvanometer circuit 16. Resistor 22 functions to compensate for such changes since it also is responsive to ambient temperature changes. Resistor 24 functions as a ballast resistor to provide a division of the battery voltage across resistors 22 and 24 in proportion to the relative resistances thereof, in accordance with the current flow through branch 18. The result is that the low value resistor 22 is very sensitive to temperature changes and exactly follows the voltage changes resulting from ambient temperature changes to which the thermocouple is subjected. For example, a loss of .1 millivolt in the voltage drop across the thermocouple will result in an increase in .1 millivolt across the compensating resistor 22.

Resistor 30 in bridge branch 20, which is the suppression branch, serves as a suppression resistor. It is not subject to changes in the ambient temperature, as by being made of material having a zero temperature coefficient of resistance, and functions to provide a voltage drop which will balance out the voltage drop across resistor 22 except for the changes in the voltage drop across resistor 22 which result from temperature changes. In addition resistor 30 provides a voltage drop to suppress or limit the range of the device 10 to a desired value. Since resistor 30 does not vary with temperature, there is a relatively small difference in the voltage drops across resistors 22 and 30 which difference is equal, but opposite in direction, to the change in the thermocouple voltage as a result of a change in the ambient temperature. For example, and not by way of limitation, if the thermocouple voltage drops by .2 millivolt due to a change in ambient temperature, resistors 22 and 30 together drop .2 millivolt from the voltage in the galvonometer circuit. For example, an ambient temperature variation causing a thermocouple voltage loss of 0.1 millivolt will also cause an increase of 0.1 millivolt in the voltage drop across compensating resistor 22. The deflection of the galvanometer (36) will then remain a direct expression of the voltage generated at the junction 46 of the thermocouple 34.

As indicated above, resistor 30 is used also to set the range of the device 10 to move the range to any desired point. For example, if the range or reading is to start at 1000° F., resistor 30 has to provide a sufficient voltage drop to neutralize the first thousand ° F. developed by the thermocouple so that the readings start at 1,000° F. Resistor 32 serves as the suppression branch ballast resistor to provide the required current flow therethrough to get the proper voltage division across resistors 30 and 32.

In the example given above in connection with branch 18, it was indicated that a current flow of 29.40 milliamperes was required for said branch. This would require a current flow in branch 20 of not less than 10.6 milliamperes or more than 20.6 milliamperes if the closed circuit voltage of supply 14 is to be 1322 millivolts. The voltage drop across resistor 30 must be equal to the voltage drop across resistor 22 at 32° F. and the voltage supplied by the thermocouple at the null point of the scale. The null point is preferably the center or midpoint, although other points can be selected, if desired. Under the conditions given, the null or midpoint thermocouple voltage will be 9.56 millivolts so that the required voltage drop across resistor 30 will be 23.02 millivolts. To provide this drop across resistor 30, while maintaining the current drain in the branch between 10.6 and 20.6 milliamperes, the resistance of resistor 30 should be 1.5 ohms. This will provide a current flow in branch 20 of 15.35 milliamperes. Consequently, the resistance of the ballast resistor 32 should be 84.83 ohms.

Battery 14 is a relatively small mercury battery of a size similar to those used in pencil flashlights, which provides a steady or constant output voltage. As previously indicated, the battery provides a total drain or current flow of 40 to 50 milliamperes through branches 18 and 20. For the values given, this requires a closed circuit voltage of 1322 millivolts, the open circuit value of the battery being 1345 millivolt. This permits for the use of a small capacity battery, rather than a large capacity battery as in the prior art, the small capacity battery providing a relatively heavy current drain when switch 44 is closed for a relatively short indicating period. There is a substantial change from 1345 to 1322—2%, but it drops to 1322 quickly enough so that the meter is reading the correct value by the time the pointer swings to its position and at the same time the drain is not so excessive, therefore a similar accurate reading can be taken within a few seconds—or the previous reading held for thirty seconds, if desired—which is more than ample time for taking a reading. The battery is loaded heavily—it is 50% of maximum recommended short interval drain. Voltage drop is 2 to 4%. Thus there is a normally open spring return thumb operated switch so that the drain can continue only when in operator's hand.

The drain is designed so that the battery holds its loaded value constant to ±¼% for a period ample to obtain a single reading (15 to 20 seconds) or for a series of successive readings without requiring a prolonged waiting period between readings.

Figure 2:
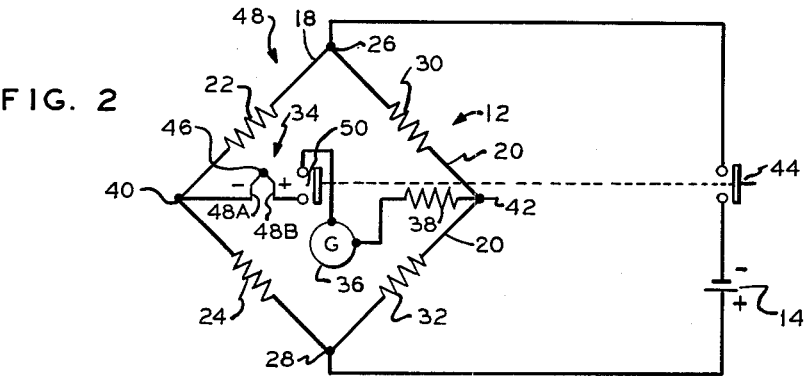
FIGURE 2 is a modified form of the invention and illustrates the presently preferred embodiment thereof.

The only operation required of the operator to prepare device 10 for accurate reading is to properly set the galvanometer 36 to its zero or null point. In FIG. 1 only, with the switch open, the galvanometer may be deflected from its null point by the temperature differences between the thermocouple junction 46 and its "cold" ends 48A and 48B. Consequently, to properly set the galvanometer to zero, it is necessary to open the thermocouple circuit 16 at a convenient point. This is facilitated by the presently preferred embodiment of the invention illustrated in FIGURE 2. Device 48 shown in FIGURE 2 is similar in all respects to device 10 in FIGURE 1 (similar parts bearing similar reference numerals), except for the insertion of switch 50 in thermocouple circuit 16. Switch 50 is ganged with switch 44 so that when the battery circuit is open, the thermocouple circuit 16 is also open to permit for a true or correct zero setting or adjustment of the galvanometer 36. In either case, closing of switch 44 for a period of 15 seconds will provide ample time for the galvanometer pointer to deflect and provide a reading of the temperature of the object or area to which the thermocouple junction 46 is applied. Said reading will be compensated for changes in ambient temperature due to the compensation provided by resistor 22. With the total voltage drops the same over both branches 18 and 20, and with branches 18 and 20 serving to compensate for changes in ambient temperature and establish a predetermined null point, it will be apparent that the current flow between the intermediate branch terminals 40 and 42 will be representative of the voltage differences between the cold ends 48A and 48B of the thermocouple. In the thermocouple circuit, resistor 38 is utilized to provide a predetermined range or calibration for the galvanometer.

Figure 3:
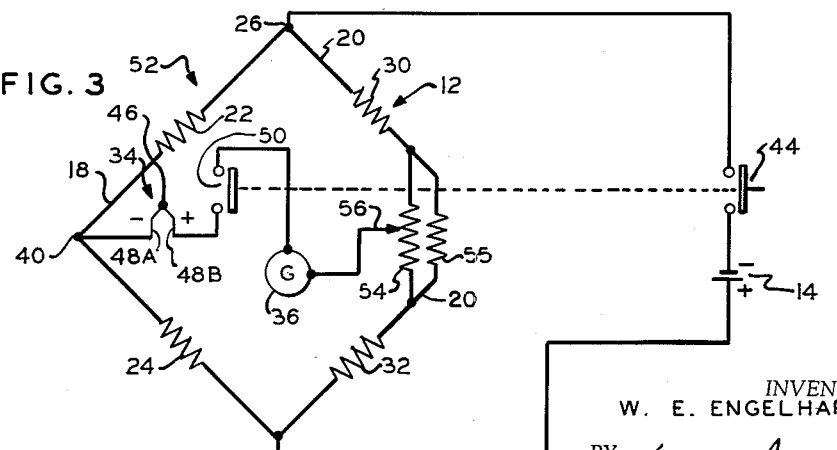
FIGURE 3 illustrates an additional embodiment.

Referring now to FIGURE 3 in detail, there is shown another modification. In FIGURE 3 the null balance point can be shifted to any point on the scale—hence changes in lead wire and thermocouple resistance introduce no error. FIGURE 3 is completely free of thermocouple lead resistance changes. FIGURES 1, 2 are completely free at null point, to ½ that of previous conventional left zero hand pyrometers at extreme deflections. The device 52 of FIGURE 3 is similar to the device 48 of FIGURE 2 (similar reference numerals indicating similar parts) except that provision is made to shift the null point over an entire range and the use of the galvanometer only as a null detector. In lieu of the range setting resistor 38 of devices 10 and 48, provision is made for a slidewire potentiometer 54–55 which is connected in series in branch 20 between resistors 30 and 32. The sliding contact 56 of the potentiometer is connected to one terminal of the galvanometer. The slidewire potentiometer is calibrated in degrees of temperature and the tap 56 is varied or adjusted to provide a zero or null reading on the galvanometer. The setting of the contact 56 when this point is attained will then indicate the temperature at the thermocouple junction 46.

The entire purpose of the circuit of FIGURES 1 and 2 is to set up within the instrument, a voltage exactly equal to that produced by a perfect thermocouple at a single predetermined point on the scale—usually the mid-point. The galvanometer then directly indicates the difference between the unknown temperature, or that to be measured, and a selected reference temperature when the circuits are closed.

A basic requirement of a hand pyrometer is that it be held and operated by one hand so that the other is free to guide the sensing end (thermocouple) to the proper contact with the surface or immersion within the body whose temperature is to be measured. In this invention, the requirement is met by providing a spring-return normally open switch operated by thumb or index finger. Or when two operations are required (FIGURE 3) to have the same switch controlled by the index finger on the under side of the grip, while the thumb is used to move the sliding contact to its proper position on the upper side.

It will be understood that various changes and modifications can be made in the present invention without departing from the inventive concept thereof.

I claim:

1. A thermocouple pyrometer comprising a Wheatstone bridge circuit having first and second branches connected between a pair of bridge terminals, a power source connected across said terminals, and a thermocouple circuit connected between said branches, said thermocouple circuit having a thermocouple and a current flow indicator, said first branch having provision to compensate for ambient temperature changes to which said thermocouple is subjected and said second branch having provision to balance voltage changes in said first branch, said provisions being the sole means to balance out the indication to voltage created at the thermocouple junction due to ambient temperature conditions, and temperature calibration means in circuit with said current flow indicator to indicate the temperature of said pyrometer.

2. A thermocouple pyrometer comprising a Wheatstone bridge circuit having first and second branches connected between a pair of bridge terminals, a power source connected across said terminals, and a thermocouple circuit connected between said branches, said thermocouple circuit having a thermocouple and a current flow indicator, said first branch having provision to compensate for ambient temperature changes to which said thermocouple is subjected and said second branch having provision to balance voltage changes in said first branch, said provisions being the sole means to balance out the indication to voltage created at the thermocouple junction due to ambient temperature conditions, a first normally open switch means in circuit between said power source and one of said bridge terminals, and a second normally open switch means provided in said thermocouple circuit and ganged with said first mentioned switch means, and temperature calibration means in circuit with said current indicator to indicate the temperature of said pyrometer.

References Cited by the Examiner

UNITED STATES PATENTS

| | | | |
|---|---|---|---|
| 1,228,678 | 6/1917 | Johnson | 73—361 |
| 2,662,406 | 12/1953 | Wohlgemuth | 73—361 |
| 2,769,340 | 11/1956 | Bernreuter et al. | 73—361 |
| 2,871,701 | 2/1959 | Kundsen | 73—361 |
| 2,971,379 | 2/1961 | Weisheit | 73—362 |
| 3,100,397 | 8/1963 | Peltola | 73—359 |

FOREIGN PATENTS

| | | |
|---|---|---|
| 471,669 | 4/1936 | Great Britain. |
| 759,381 | 10/1956 | Great Britain. |

ISAAC LISANN, *Primary Examiner.*